United States Patent [19]

Rojecki

[11] Patent Number: 4,773,713
[45] Date of Patent: Sep. 27, 1988

[54] BRAKE CONTROL SYSTEM

[75] Inventor: Walter E. Rojecki, Watertown, N.Y.

[73] Assignee: General Signal Corporation, Stamford, Conn.

[21] Appl. No.: 51,358

[22] Filed: May 19, 1987

[51] Int. Cl.4 .......................... B60T 11/34; B60T 15/32
[52] U.S. Cl. ........................................ 303/33; 303/39; 303/69
[58] Field of Search .................... 303/9, 33, 37, 39, 40, 303/46, 57, 58, 59, 63, 69, 71, 81, 85

[56] References Cited

U.S. PATENT DOCUMENTS

| 2,994,565 | 8/1961 | McClure et al. | 303/58 X |
| 4,127,308 | 11/1978 | McEathron | 303/35 |
| 4,188,071 | 2/1980 | Hart | 303/33 |

FOREIGN PATENT DOCUMENTS 2717560  10/1978  Fed. Rep. of Germany ........ 303/69

Primary Examiner—Andres Kashnikow
Assistant Examiner—Timothy Newholm
Attorney, Agent, or Firm—Robert R. Hubbard; Harold Wynn

[57] ABSTRACT

A housing has a triple valve coaxially adjoining a proportioning piston valve end-to-end, the triple valve having supply, lap and exhaust positions for governing pressure in a brake cylinder; and the proportioning piston valve being operable to sense an emergency signal in a brake pipe for delivering fluid from an emergency reservoir to the brake cylinder after the brake cylinder has been charged to substantially service pressure from an auxiliary reservoir. The triple valve and the proportioning valve piston are biased in opposite directions by the same biasing spring.

9 Claims, 1 Drawing Sheet

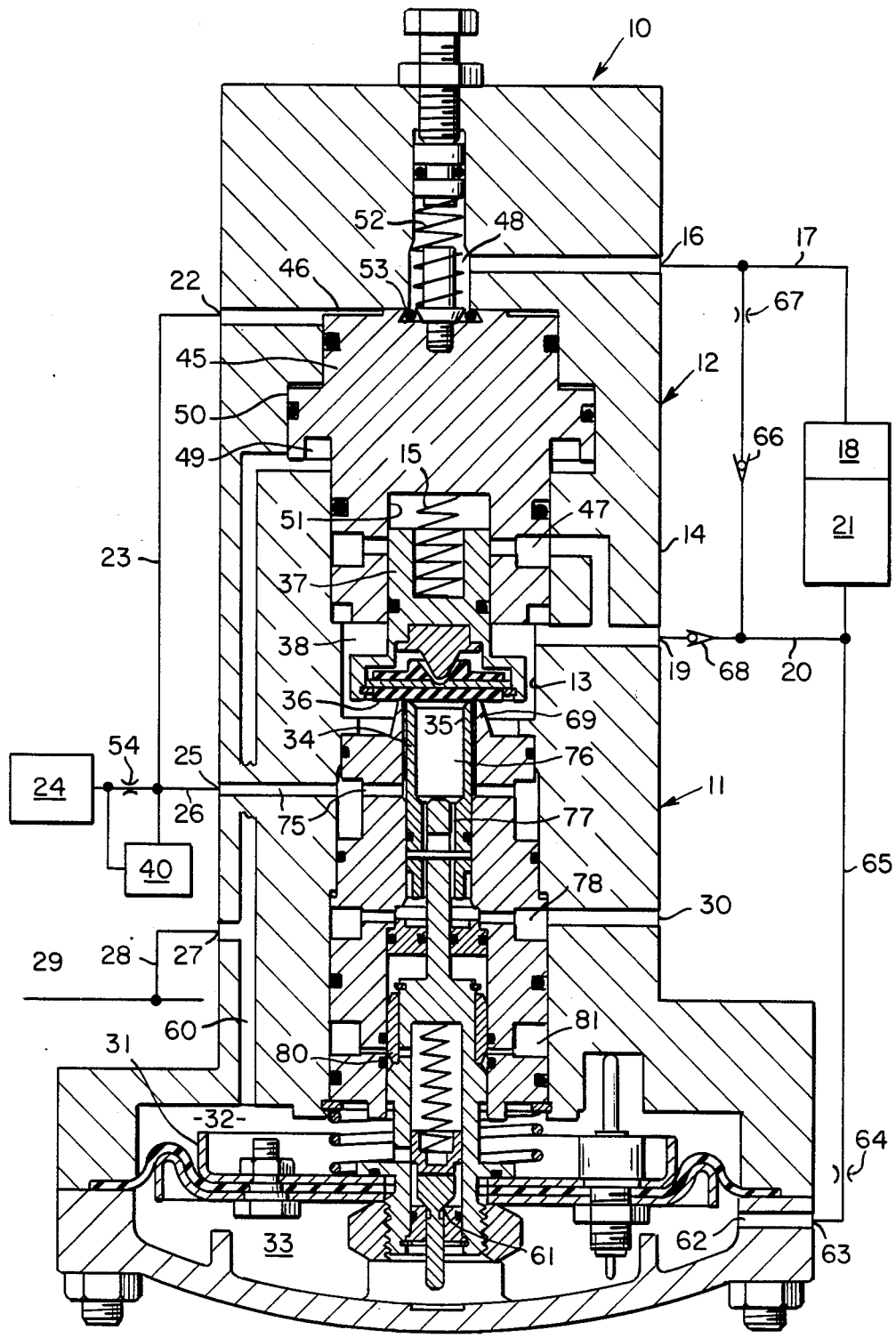

BRAKE CONTROL SYSTEM

BACKGROUND OF THE INVENTION

This invention relates to fluid brake control systems for railroad vehicles and it more particularly relates to a combined triple valve and proportioning valve device for such a system.

It is known in a prior McEathron U.S. Pat. No. 4,127,308, granted Nov. 18, 1978 and in a prior Hart U.S. Pat. No. 4,188,071, granted Feb. 12, 1980, as well as in a prior Engle U.S. application Ser. No. 776,763, filed Sept. 16, 1985, which has resulted in U.S. Pat. No. 4,653,812, granted Mar. 31, 1987, that considerably smaller emergency and auxiliary reservoirs are rerquired if, for an emergency brake application, a brake cylinder is charged first to service brake presure from the auxiliary reservoir, and then from the emergency reservoir to emergency brake pressure, without equalizing the emergency and auxiliary reservoir pressures. This mode of operation is provided according to the prior art by the use of separate and independent emergency equalizing, and triple valves.

An object of the present invention is to provide the fluid brake control system which substantially obviates one or more of the limitations and disadvantages of the described prior systems.

Another object of the present invention is to reduce the number of separate valves required by combining the emergency equalizing valve and the triple valve into a single control valve device.

Other objects, purposes and characteristic features of the present invention will be in part obvious from the accompanying drawing and in part pointed out as the description of the invention progresses.

SUMMARY

A fluid brake control system is provided for governing application and release of fluid brakes of a railway vehicle having a brake control pipe, a brake cylinder, an auxiliary reservoir, an emergency reservoir, and a control valve device having respective brake pipe, brake cylinder, auxiliary reservoir and emergency reservoir ports. The control valve device comprises a triple valve and a proportioning valve coaxially disposed end-to-end in a bore of a housing.

In response to sensing an emergency rate of fluid pressure reduction in the brake pipe, emergency brake pressure is built up in the brake cylinder, first by fluid from the auxiliary reservoir and then by fluid from the emergency reservoir as determined by the proportioning valve device, thus reducing the size of the reservoirs required by it being unnecessary to equalize the pressures of the emergency reservoir and the auxiliary reservoir according to usual practice.

For a better understanding of the present invention, together with other and further objects thereof, reference is made to the following description taken in connection with the accompanying drawings, while its scope will be pointed out in the appending claims.

DRAWING

The drawing illustrates, partly by elevational cross-section and partly by block diagram, schematically, a brake control device for a railway vehicle according to a preferred embodiment of the present invention.

With reference to the drawing, a control valve device 10 comprises a triple valve 11 and a emergency valve 12, the triple valve 11 and the emergency valve 12 being coaxially positioned, end-to-end, in a bore 13 of a housing 14. The triple valve 11 and the emergency valve 12 are normally biased to a closed position by a spring 15.

More specifically, the control valve device 10 has an emergency reservoir port 16 for connection as by a passage 17 to an emergency reservoir 18; and similarly the control valve device 10 has an auxiliary reservoir port 19 for connection over a passage 20 to an auxiliary reservoir 21. The control valve device 10 also has a brake cylinder port 22 for connection over a passage 23 to a brake cylinder 24, a second brake cylinder port 25 can be connected by a passage 26 to the brake cylinder 24. A brake pipe port 27 can be used to connect the control valve device 10 over passage 28 to a brake pipe 29. An atmospheric port 30 is used in releasing the pressure in the brake cylinder 24.

At the lower end of bore 13, a diaphragm piston 31 compares fluid pressures in respective brake pipe and auxiliary chambers 32 and 33 for actuating a push rod 34 having an annular seat 35 operable against a supply valve disc 36, the disc 36 being biased against the seat 35 by the force of spring 15 applied through a biasing piston 37. The triple valve disc 36 governs passage of auxiliary reservoir fluid through a chamber 38 to a brake cylinder port 25 of the control valve device 10.

The emergency, or proportioning, valve 12 has a proportioning piston 45 having an upper annular brake cylinder fluid pressure chamber 46 for sensing the build up of pressure in the brake cylinder 24. This is compared with auxiliary reservoir pressure in a chamber 47 beneath the proportioning piston 45 and the upper end of piston 45 is also exposed in part to a chamber 48 tht is connected to the emergency reservoir 18 through emergency port 16. The pressure in chamber 48 is opposed by brake pipe pressure in chamber 49 beneath a shoulder 50 of the proportioning piston 45. A bore 51 in the lower side of proportioning piston 45 provides a seat for the spring 15. An adjustable calibrating spring 52 is provided above the proportioning piston 45 for biasing the piston 45 in opposition to the force of the spring 15. A valve 53 in the upper surface of the proportioning piston 45 is normally closed to seal emergency chamber 48 from the brake cylinder chamber 46. An inshot valve 40 is provided for selectively bypassing a choke 54 in brake cylinder passage 26.

Having thus considered the general organization of the system, further consideration of the control valve device will be given relative to the typical mode of operation of the system.

BRAKE CYLINDER RELEASE AND CHARGING

When fluid pressure in the brake pipe 29 increases, fluid passes through passage 28 to brake pipe port 27, and from there through a passage 60 to the brake pipe fluid pressure chamber 32 on the upper side of the diaphragm piston 31, and also to the fluid pressure chamber 49 beneath the shoulder 50 of proportioning piston 45. The charging of chamber 32 drives the diaphragm piston 31 downwardly and opens a valve 61 to charge the chamber 33 beneath the piston 31 and from there through a passage 62 to an auxiliary reservoir port 63 and through a choke 64 and a passage 65 to the auxiliary reservoir 21. The emergency reservoir 18 is charged through the same auxiliary reservoir charging passage and over passage 20, check valve 66, choke 67 and passage 17. Fluid pressure is also applied through check valve 68 and auxiliary port 19 to the chambers 38 and 47 connected thereto.

The annular valve 53 at the top of the emergency proportioning piston 45 is closed by bias of spring 15 and by brake pipe pressure acting in chamber 49 during the charging operations, and similarly the spring 15 keeps the supply disc 36 closed against a fixed angular seat 69 on the triple valve 11.

SERVICE APPLICATION

If a signal for a service application is sensed by reduction of fluid pressure in the brake pipe 29, reduced pressure fluid in chamber 32 above the diaphragm piston 31 causes this piston to rise, and the rising of piston 31 raises service disc 36 off of its fixed seat 69 by the raising of the push rod 34, and opens a passage between seats 69 and 35 to permit auxiliary fluid in chamber 38 to flow through a passage 75 to brake cylinder port 25, and from there through passage 26 to the brake cylinder 24. After initial charge through the inshot valve 53 to bypass the choke 54, the inshot valve is operated to cause further charging to be through the choke 54. The proportioning valve 53 is maintained closed during this operation, because of brake pipe pressure in chamber 49 and also because of the added pressure exerted by the spring 15 upon the service disc 36 being lifted to open the supply valve for charging the brake cylinder 24.

The push rod 34 also includes a spool valve 80 that can be used to delivery brake pipe fluid from chamber 32 through a passage 81 and a quick service limiting valve (not shown) to the brake cylinder 24 during initial charging of the brake cylinder 24.

When the brake cylinder 24 is charged to a service fluid pressure substantially the same as in the brake pipe 29, the chambers on the opposite sides of the diaphragm piston 31 have their pressures substantially equalized, and the push rod 34 moves down to actuate the supply disc 36 against the annular seats 35 and 69, which is a lap position for the control of brake cylinder 24.

SERVICE RELEASE

To release the service application, the brake pipe 29 is again charged to normal pressure, and the diaphragm piston 31 senses the increased pressure in the brake pipe 29 to operate the push rod 34 downwardly and permit the brake cylinder 24 to be connected to atmosphere through choke 54, passage 26, brake cylinder port 25, passage 75, chamber 76 within the upper end of push rod 34 and passages 77 and 78 connecting the chamber 76 to a vent port 30.

As the pressure rises in the brake pipe 29, the auxiliary reservoir 21 is charged at substantially the same rate as the charging of the brake pipe 29, and substantial equalization of fluid pressures in chambers 32 and 33 causes the diaphragm piston 31 to be restored to its normal position so that the push rod 34 rises to close the exhaust passage that has been described.

EMERGENCY APPLICATION

For an emergency application, fluid pressure is rapidly reduced in the brake pipe 29, and the brake cylinder 24 is initially charged from the auxiliary reservoir 21 by the same mode of operation that has been described for a service brake application until the brake cylinder 24 is wtihin approximately 5% of service pressure. At this time, the brake pipe pressure chamber 49 has had its pressure reduced substantially to zero, and the emergency proportioning piston 45 is comparing auxiliary reservoir pressure in chamber 49 beneath the piston 45 with the brake cylinder pressure in chamber 46 above the piston 45 until brake cylinder pressure is within 5% of auxiliary reservoir pressure. The emergency chamber 48 pressure being above the piston 45 now becomes effective to drive the piston 45 downwardly against the spring 45 to insure the closing of the supply disc 36 against the seats 35 and 69 to seal off the auxiliary reservoir 21 and open valve 53 at the top of proportioning piston 45 to supply fluid from the emergency reservoir 18 to the brake cylinder 24 through brake cylinder port 22 and passage 23 for raising the brake cylinder pressure 24 to emergency pressure.

RELEASE AFTER EMERGENCY

The recharging of the brake pipe 29 after an emergency brake application causes the brake pipe pressure to be applied in chamber 49 beneath the shoulder 50 of proportioning piston 45 to force the proportioning valve 53 to closure. The push rod 34 is now raised to open passages that have been described for the exhaust of fluid in brake cylinder 24 through the atmospheric port 30. The auxiliary reservoir 21 and the emergency reservoir 18 are recharged and when the brake pipe 29 is charged to its normal pressure, the push rod 34 is moved downwardly to let the supply disc 36 seat upon both the seats 35 and 69 to restore the conditions of the valves 11 and 12 to their normal conditions.

Having thus described a fluid brake control system for railroad vehicles having an improved control valve device as a preferred embodiment of the present invention, it is to be understood that various modifications and alterations may be made to the specific embodiment shown without departing from the spirit or scope of the invention.

I claim:

1. An air brake control system having a brake pipe, a brake cylinder, an auxiliary reservoir, an emergency reservoir and a control valve device having respective brake pipe, brake cylinder, auxiliary reservoir and emergency reservoir ports comprising;
   (a) triple valve means having a poppet valve disc biased against annular coaxial seats for selectively delivering fluid pressure from the auxiliary reservoir port to the brake cylinder port or exhausting fluid from the brake cylinder port as governed by changes of fluid pressure in the brake pipe,
   (b) proportioning valve means coaxial with the triple valve means and adjoining the triple valve means end-to-end for at times delivering fluid pressure from the emergency reservoir port to the brake cylinder port;
   (c) the proportioning valve means comprising a proportioning stepped piston operable in accordance with a change in ratio of auxiliary reservoir pressure to brake cylinder pressure,
   (d) the proportioning stepped piston being operable in accordance
   (e) with comparing brake pipe pressure with brake cylinder pressure, the proportioning valve means having an emergency charging control valve operatively connected to said proportioning stepped piston for at times connecting the emergency reservoir port to the brake cylinder port,
   (f) the proportioning valve means having a calibrating spring acting on the emergency charging control valve for causing the emergency charging control valve to open at a time when brake cylinder pressure rises to service pressure during an emergency brake application, and (g) the triple valve means being operated to a lap position when the emergency charging control valve is opened.

2. An air brake control system according to claim 1 wherein the poppet valve disc and a proportioning piston of the proportioning valve means are biased in opposite directions by a biasing means.

3. An air brake control system according to claim 2 wherein the biasing means includes a coil spring coaxial with the poppet valve disc and the proportioning stepped piston of the proportioning valve means.

4. An air brake control system according to claim 3 wherein the biasing means comprises a biasing piston for applying the force of the biasing spring to the poppet valve disc.

5. An air brake control system according to claim 4 wherein the force of the coil spring is applied to the proportioning stepped piston within a coaxial bore in the proportioning stepped piston.

6. An air brake control system according to claim 1 wherein one of the annular seats of the triple valve means is operable in accordance with a change in ratio of brake pipe pressure relative to auxiliary reservoir pressure sensed by chambers on opposite sides of a diaphram piston axially connected to said one of the annular seats.

7. An air brake control system having a valve housing comprising;

(a) coaxial stepped bores for receiving triple valve means and proportioning piston valve means adjoining end-to-end.

(b) respective brake pipe, brake cylinder, auxiliary reservoir and emergency reservoir ports, (c) brake cylinder and auxiliary reservoir pressure chambers at opposite ends of a proportioning piston of the proportioning valve means connected respectively to the brake cylinder and auxiliary reservoir ports.

(d) emergency reservoir and brake pipe pressure chambers for oppositely acting upon the proportioning piston connected respectively to the emergency reservoir and brake pipe ports.

(e) coaxial bores for receiving a calibrating spring and a biasing spring for acting respectively on opposite portions of the proportioning piston, the biasing spring also acting on a valve disc of the triple valve means, and (f) brake pipe and auxiliary reservoir pressure chambers on opposite sides of a diaphram piston connected to the brake pipe and auxiliary reservoir ports respectively for operating a push rod of the triple valve means.

8. An air brake control system according to claim 7 wherein the push rod of the triple valve mans has an annular seat acting against the valve disc to at times open a passage from the auxiliary reservoir port to the brake cylinder port and at other times permit exhaust of fluid from the brake cylinder to atmosphere.

9. An air brake control system according to claim 8 wherein the push rod operates within a fixed annular seat wherein a lap position is established when pressure at the brake pipe port is substantially equal to pressure at the auxiliary reservoir port.

* * * * *